United States Patent [19]

Taylor

[11] 4,293,180
[45] Oct. 6, 1981

[54] RESILIENT BIASING MEANS
[75] Inventor: Derek Taylor, Whitstable, England
[73] Assignee: Bunker Ramo Corporation, Oak Brook, Ill.
[21] Appl. No.: 43,604
[22] Filed: May 29, 1979
[30] Foreign Application Priority Data May 31, 1978 [GB] United Kingdom ............... 25338/78

[51] Int. Cl.³ .......................................... H01R 13/422
[52] U.S. Cl. ................................................ 339/217 R
[58] Field of Search ............ 339/217 R, 217 S, 210 R, 339/210 M, 91 R

[56] References Cited

U.S. PATENT DOCUMENTS

| | | | |
|---|---|---|---|
| 3,246,281 | 4/1966 | Cunningham | 339/217 S X |
| 3,327,282 | 6/1967 | Krolak | 339/217 S X |
| 3,478,305 | 11/1969 | Chirumbolo | 339/217 S |
| 3,708,780 | 1/1973 | Pierce | 339/217 S X |
| 3,727,172 | 4/1973 | Clark | 339/217 S X |
| 3,835,442 | 10/1974 | Anderson et al. | 339/217 S X |
| 3,933,406 | 1/1976 | Camaron et al. | 339/91 R |
| 3,947,182 | 3/1976 | McCartney | 339/74 R X |
| 4,072,383 | 2/1978 | Cameron et al. | 339/59 R |
| 4,082,398 | 4/1978 | Bourdon et al. | 339/217 S X |
| 4,114,971 | 9/1978 | Heinbrock | 339/210 R X |

FOREIGN PATENT DOCUMENTS

| | | |
|---|---|---|
| 848029 | 3/1977 | Belgium . |
| 2089 | 11/1978 | European Pat. Off. . |
| 1565980 | 5/1970 | Fed. Rep. of Germany . |
| 2743626 | 4/1978 | Fed. Rep. of Germany . |
| 2366716 | 4/1978 | France . |
| 945482 | 9/1959 | United Kingdom . |
| 984249 | 2/1965 | United Kingdom . |
| 1149701 | 4/1969 | United Kingdom . |
| 1151558 | 5/1969 | United Kingdom . |
| 1458169 | 12/1976 | United Kingdom . |
| 1504274 | 3/1978 | United Kingdom . |
| 2004664 | 9/1978 | United Kingdom . |
| 2005863 | 10/1978 | United Kingdom . |
| 1534327 | 11/1978 | United Kingdom . |

OTHER PUBLICATIONS

"Electrical Multiple Connector Combines 62 Parts into One," Product Engineering, vol. 42, No. 14, p. 53 (9-1971).

Primary Examiner—Eugene F. Desmond
Attorney, Agent, or Firm—N. A. Camasto; J. R. Hoffman; F. M. Arbuckle

[57] ABSTRACT

This invention relates to electrical and optical fibre connectors. In the past, the terminal ends of electrical conductors or optical fibres retained in a connector have not reliably maintained a desired separation of the ends of optical fibres or a secure conducting connection formed between electrical conductors. According to the present invention, there is provided an improved optical fibre or electrical connector, comprising a termination member suitable for terminating an electrical conductor or an optical fibre, the termination member being slidably mounted through an aperture in a connector body-member, and a biasing element resiliently biasing the termination member against sliding movement in a first direction relative to the connector body-member. The biasing element comprises at least one resilient tine acting between the two members with the free end of the tine in sliding engagement with a surface on one of the two members, which surface is non-parallel with the indicated direction, whereby the tine suffers deflection about its root and transverse to the first direction on the occurrence of relative movement between the two members in the first direction.

7 Claims, 4 Drawing Figures

RESILIENT BIASING MEANS

TECHNICAL FIELD

This invention relates to electrical and optical-fibre connectors.

BRIEF SUMMARY OF THE INVENTION

It is an object of this invention to provide a connector in which the terminal end of an electrical conductor or an optical fibre can be retained in the connector and resiliently baised such that a desired separation of the ends of optical fibres can be attained or a secure conducting connection can be formed between electrical conductors.

According to the present invention there is provided an improved optical fibre or electrical connector, comprising a termination member suitable for terminating an electrical conductor or an optical fibre, the termination member being slidably mounted through an aperture in a connector body member, and a biasing element resiliently biasing the termination member against sliding movement in a first direction relative to the connector body member. The biasing element comprises at least one resilient tine acting between the two members with the free end of the tine in sliding engagement with a surface on one of the two members, which surface is nonparallel with the indicated direction, whereby the tine suffers deflection about its root and transverse to the first direction on the occurrence of relative movement between the two members in the first direction.

BRIEF DESCRIPTION OF THE DRAWINGS

Two embodiments of the invention will now be described by way of example with reference to the accompanying drawings, in which.

DETAILED DESCRIPTION OF THE INVENTION

Figure 1:
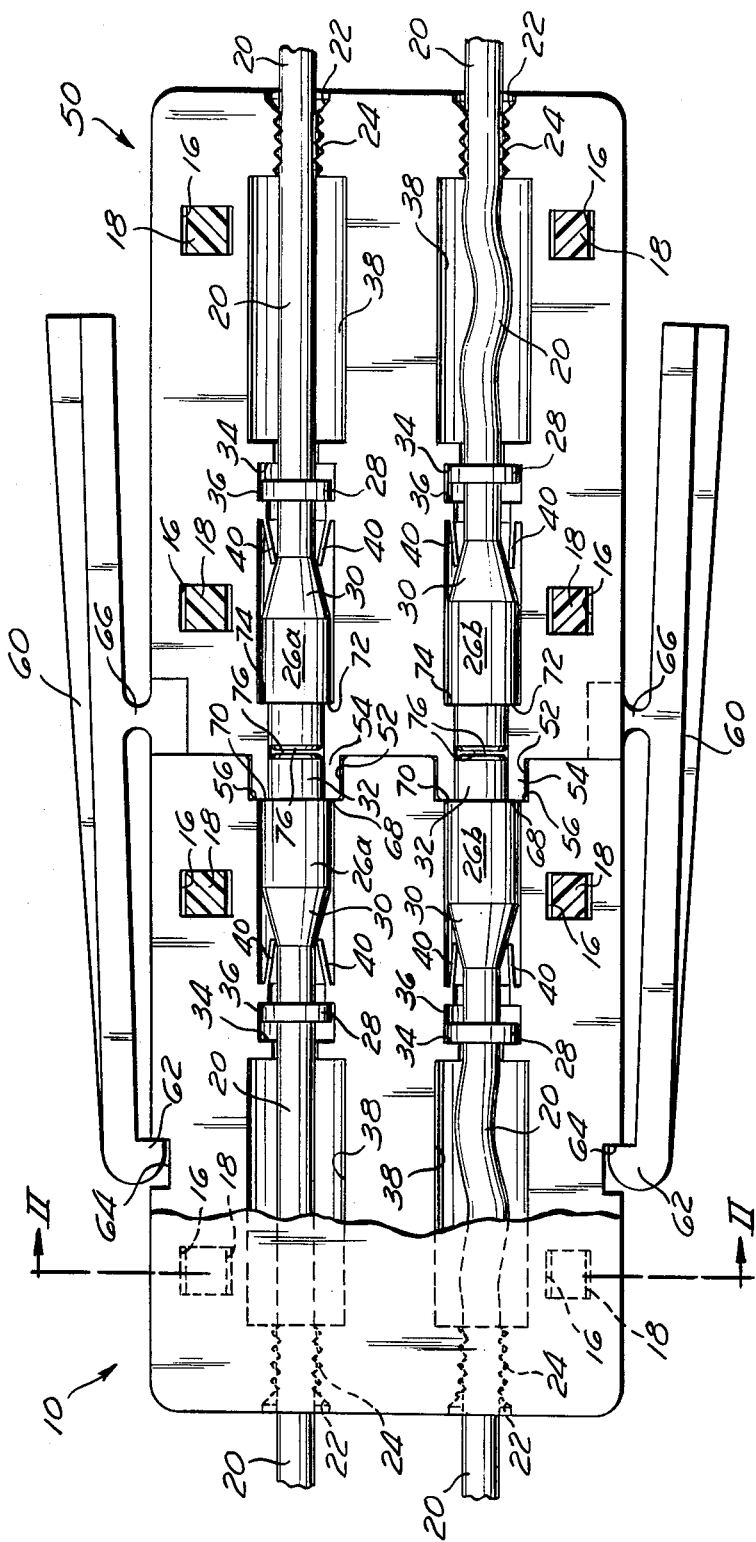
FIG. 1 shows both parts of a two-part optical-fibre connector, partly in section.
Figure 2:
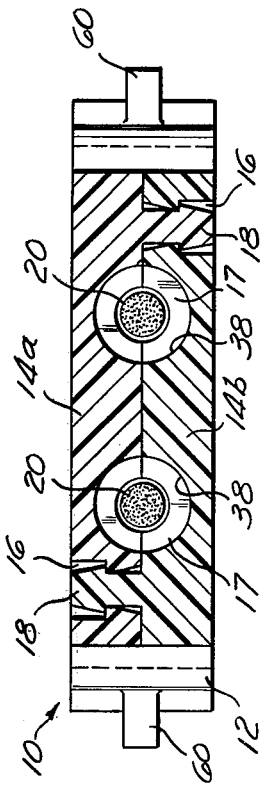
FIG. 2 shows a cross-section along the line 11—11 of FIG. 1.

The optical fibre connector shown in FIGS. 1 and 2 comprises a first part indicated generally at 10 coupled with a second part indicated generally at 50.

The first part 10 comprises a body 12 formed from two interengaging half bodies 14a and 14b each moulded from plastics material. The half-bodies 14 are held together by the engagement of pegs 18 formed integrally with each half-body 14 with shoulders in corresponding sockets 16. Each body 12 thus formed has two passages 17 of generally cricular cross-section formed therethrough. An optical-fibre 20 passes into each passage 17 through a frusto-conical entry port 22 and is secured in the body 12 by a serrated portion 24 of the passage 17. Each fibre 20 is terminated by a termination member in the form of a ferrule 26a, or 26b, of generally circular cross-section which has a flanged portion 28 adjacent its rearward end (the left-hand end of the part 10 in FIG. 1), a frusto-conical ramped portion 30, nearer its forward end, and a terminal portion 32. Each ferrule 26 is free to slide axially in the body between forward and rearward limits determined by abutment of the flange 28 against respective shoulders 36, 34 formed within the body. In FIG. 1, the upper ferrule 26a is shown in its extreme forward position and the lower ferrule 26b is shown in its extreme rearward position. The passage has a portion 38 of increased cross-section which allows for buckling of the fibre 20 as shown in FIG. 1 for the lower ferrule 26b.

Resilient tines 40 are formed integrally with the body 12 and urge each ferrule 26 in a forward direction by engagement with the frusto-conical ramp portions 30 of the ferrules 26a, 26b.

The second part 50 of the connector includes the features described above with reference to the first part 10 and such features are indicated by identical reference numerals. The forward end of this part 50 is the left-hand end in FIG. 1.

Each passage 17 through the first part 10 of the connector is increased in diameter at its forward end to form a cylindrical recess 52 which, when the parts 10 and 50 are connected, accommodates a corresponding cylindrical projection 54 formed around the forward end of each passage 17 through the second part 50. The recesses 52 and projections 54 are so dimensioned that respective end faces 56 and 68 of the first and second connector parts are in contact when the two connector parts are coupled as shown.

Integral resilient latches 60 are connected by stem portions 66 to the body 12 of the second part 50 and have hooked portions 62 which engage notches 64 formed in the body 12 of the first connector part 10.

When the connector parts 10 and 50 are coupled as described above, shoulders 70 on the ferrules 26a, 26b of the first part 10 are urged by the lines 40 of the first part 10 against the ends 68 of the projections 54, and shoulders 72 on the ferrules 26a, 26b of the second part 50 are similarly urged against shoulders 74 on the inside of the passages 17. The lengths of the terminal portions 32 of the ferrules 26a, 26b are chosen such that the end-faces 76 of each ferrule are held with a clearance of approximately 0.0254 mm therebetween.

Figure 3:
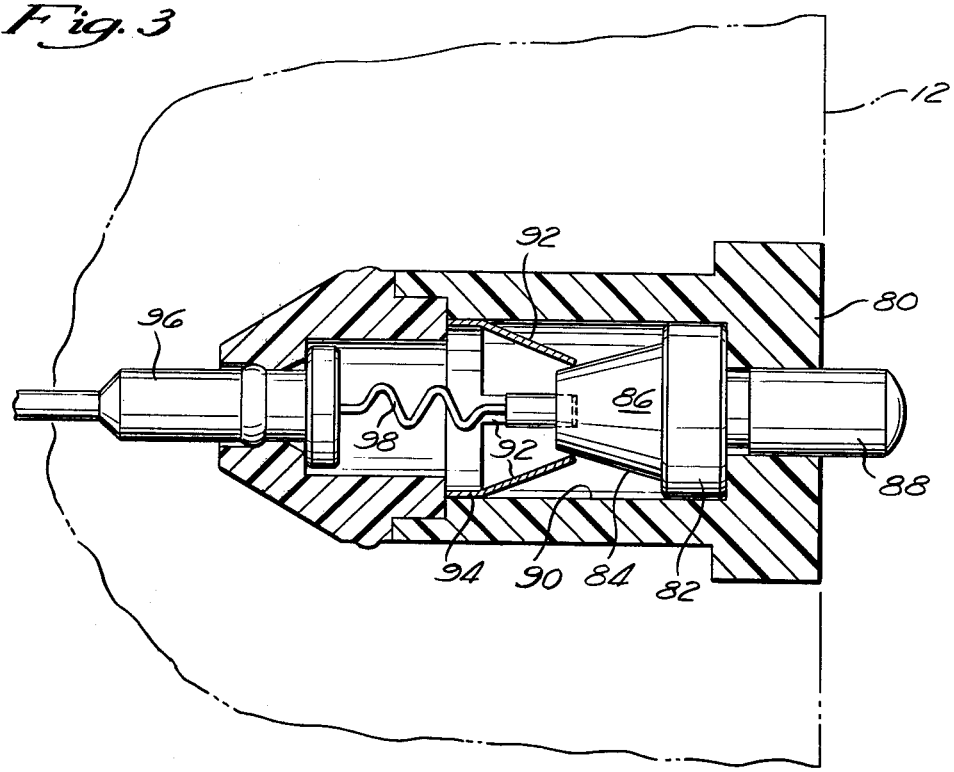
FIG. 3 shows a portion of one part of a two-part electrical connector, partly in section.
Figure 4:
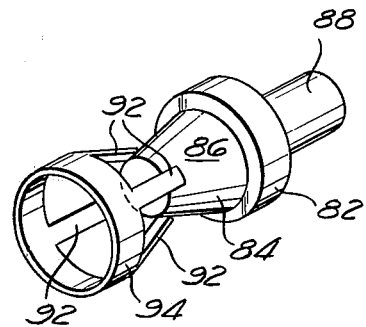
FIG. 4 shows an assembly of tines and part of a connector contact separated from the connector shown in FIG. 3.

Referring now to FIGS. 3 and 4, the portion of one part of an electrical connector is shown. The connector has a body 80 in which a conductor-termination member in the form of a movable contact 86 is mounted. The contact 86 is formed having a flange portion 82 and a rearwardly tapering frusto-conical ramp portion 84 (towards the right-hand end in FIG. 3). The contact 86 slides axially in a passage 90 in the body 80 and is urged forwardly by four resilient metal tines 92 which act upon the frusto-conical portion 84 of the contact 86. The tines 92 are connected to a circular band 94 which fits within the passage 90. The movable contact 86 is connected to a fixed contact 96 which is mounted in the body 80 rearwardly of the movable contact 86 and is connected thereto by a flexible conductor wire 98.

In use, the forward end 88 of the movable contact 86 is held by the resilient tines 92 in engagement with a contact in another device (not shown) to which it is desired to make an electrical connection.

FIG. 4 shows the resilient tines 92, the band 94 and the movable contact 86 separated from the body 80 of the connector part.

I claim:

1. An optical fibre or electrical connector, comprising:

a connector body member; means defining a passageway extending through said body member; a termination member, suitable for terminating an electrical conductor or an optical fibre, said termination member being mounted for sliding movement within said passageway; means resiliently biasing said termination member against sliding movement in a first direction in said passageway relative to said connector body member, said biasing means comprising at least one resilient tine acting between said termination member and said connector body member with a free end of said tine in sliding engagement with a surface on said termination member, said surface being non-parallel with said first direction and causing said tine to be deflected about its root transverse to said first direction upon the occurrence of relative movement between said termination member and said connector body member in said first direction; and means independent of said biasing means for limiting sliding movement of said termination member in said passageway, said movement limiting means limiting sliding movement of said termination member in said passageway between spaced-apart forward and rearward limit positions.

2. The connector as claimed in claim 1, wherein: said connector body member is of molded plastic material; and a plurality of said tines is provided which are integral with said body member.

3. The connector as claimed in claim 1, wherein a plurality of said tines is provided and extend from a supporting band, mounted in said body member.

4. The connector as claimed in claim 3, wherein said tines and band are integral and are of resilient metal.

5. An optical fibre or electrical connector, comprising:

a connector body member; means defining a passageway extending through said body member; a termination member suitable for teminating an electrical conductor or an optical fibre, said terminating member being mounted for axial sliding movement within said passageway; means resiliently biasing said termination member against sliding movement in a first axial direction in said passageway relative to said connector body member, said biasing means comprising at least one resilient tine acting between said termination member and said connector body member with a free end of said tine in sliding engagement with a surface on said termination member, said surface on said termination member converging in said first axial direction and said free end of said tine converging in the opposite direction, said tine being outwardly deflected about its root transverse to said first axial direction upon the occurrence of relative movement between said termination member and said connector body member in said first axial direction; and means independent of said tine for limiting sliding movement of said termination member in said passageway, said movement limiting means limiting sliding movement of said termination member in said passageway between spaced apart forward and rearward limit positions.

6. The connector as claimed in claim 5, wherein said surface on said termination member is a frusto-conical ramp.

7. The connector as claimed in claim 6 wherein said biasing means comprises a plurality of resilient tines in engagement with said frusto-conical ramp.

* * * * *